June 6, 1939.  J. DE LA CIERVA  2,161,699
BLADE FOR AIRCRAFT SUSTAINING ROTORS
Filed April 29, 1937
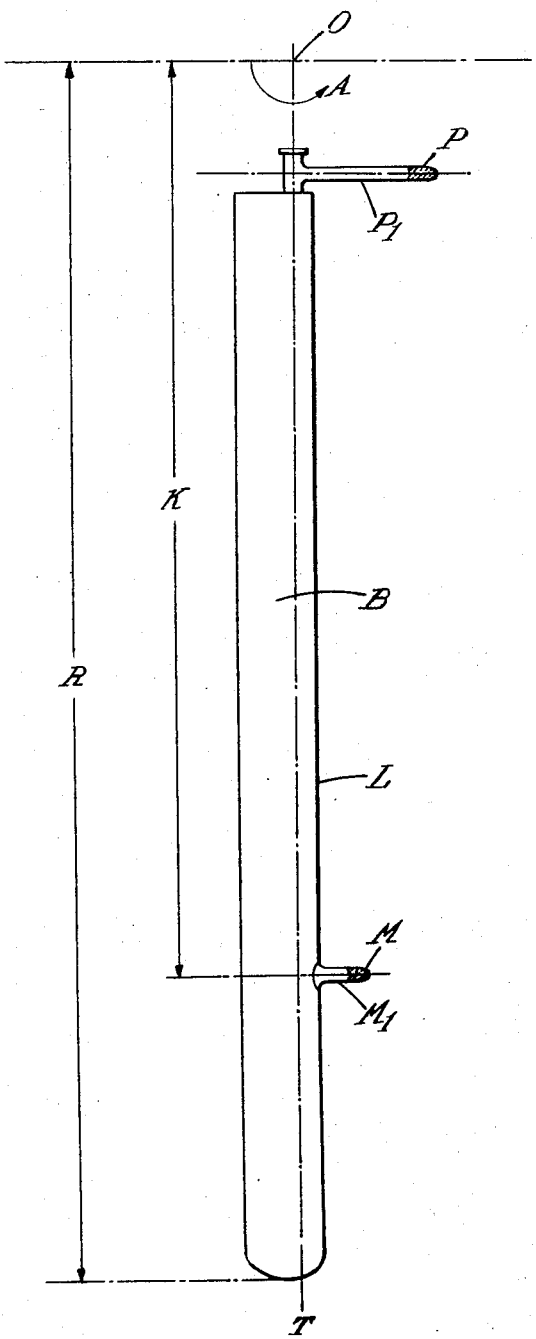

Patented June 6, 1939

2,161,699

UNITED STATES PATENT OFFICE 2,161,699

BLADE FOR AIRCRAFT SUSTAINING ROTORS

Juan de la Cierva, deceased, late of Aldwych, London, England, by John Josselyn, London, England, and Reginald Blake, Aldwych, London, England, administrators, assignors, by mesne assignments, to Autogiro Company of America, a corporation of Delaware Application April 29, 1937, Serial No. 139,813
In Great Britain May 1, 1936

7 Claims. (Cl. 244—18)

The present invention relates to improvements in blades for aircraft sustaining rotors of the kind in which the blades rotatable about an approximately vertical axis are articulated to the hub member for flapping or/and other, e. g., pitch varying, movements.

It has been found that ordinarily practicable methods of blade construction do not allow of the mass centre being situated as far forward with respect to the centre of pressure as is desirable in order to obtain the optimum value for some at least of the characteristics of the rotor and its blades. It has therefore been proposed to load the blade towards its leading edge with auxiliary masses additional to structural requirements.

It is however highly desirable to minimise the bending stresses in the blade, and in some cases at least it is also desirable not to alter to any marked extent and particularly not sensibly to decrease the natural frequency of flexural vibration of the blade, and it is further desirable to minimise parasitic torsional vibrations arising from bending or any other cause.

With these objects, the improvement according to the present invention broadly consists in so locating any additional non-structural masses that they have no substantial effect on the natural flexural frequency of the blade and do not increase but if anything decrease the static bending moments (i. e., the moments exclusive of flexural deflection effects) to which the blade is subjected.

This may be effected by concentrating any additional non-structural mass at or near the node of the gravest mode of flexural oscillation, i. e., the centre of inertia of the blade about its root, supplemented, if desired, by weights adjacent the root of the blade.

In so far as additional mass is used to bring the mass centre of the blade forward of its normal structural position, the purpose of such a mass being to produce or increase a negative (pitch decreasing) pitching couple and this pitching couple being produced by a centrifugal action, the additional mass must be situated remote from the root and is therefore located, according to a feature of the present invention, at or near the node of flexural oscillation in the "flapping" plane, which node is displaced slightly outboard from the centre of inertia by reason of the effect of the curvature of the blade in flexion; the additional mass being preferably in the form of a single concentrated mass or "preponderance weight". Hitherto such mass has been situated near the top (for instance as shown in my copending application No. 738,349) to obtain the greatest possible centrifugal effect and thus to secure the required effect from the smallest possible non-structural mass increment, but when the preponderance weight is at or near the centre of inertia (as shown in the instant case) the resulting diminution of its radial distance must be compensated by a proportionate increase of mass or of pitching leverage, e. g., by mounting it on a bracket extending forward from the leading edge.

In the normal forms of blade construction, which approximate to uniform mass distribution along the length of the blade the centre of inertia is at two thirds of the tip radius and the node of oscillation at about 0.75 of the tip radius; and as the centroid of average thrust distribution on the blade is at a larger fraction of the tip radius, the consideration of minimizing static bending moment makes it advisable in some instances to place the preponderance weight somewhat outward of the said nodal point.

Taking all circumstances into consideration the preponderance weight is preferably situated at between 0.75 and 0.8 of the tip radius with blades of normal construction, i. e., not departing markedly from uniform mass distribution (when non-structural additional masses are neglected).

On the other hand it has been found that to obtain the optimum characteristics of a rotor, whereof the blade articulation includes a downwardly and outwardly directed secondary pivot or equivalent means giving decrease of pitch angle when the blade leads from its normal radial position, certain conditions require the blade to have a torsional moment of inertia about a longitudinal or pitching axis higher than its normal structure would possess. Further, to obtain the said optimum characteristics, it is desirable to be able to adjust the said torsional moment of inertia to a required value with a high degree of accuracy.

According to another feature of this invention the required increment and/or adjustability of torsional inertia is provided by mounting one or more additional non-structural mass elements in a transverse plane at or close to the root of the blade. These additional mass elements are preferably situated in or near to the plane of the chord, as the torsional inertia component of masses located in this plane is favourable but that of masses in the perpendicular plane is generally detrimental.

By locating such mass or masses at or close to the blade root they are incapable of having any effect on the bending moment or on the flexural frequency or on any action depending on centrifugal restoring moments. In fact they have no substantial effect other than the specific one of increasing the torsional inertia as required.

An example of a rotor blade constructed in accordance with the invention is illustrated in the accompanying drawing showing a rotor blade in plan view.

In the drawing B indicates the blade which is adapted to be articulated to the rotor hub by means of the usual flapping pivot and if desired other pivotal connections which may preferably include a pivotal axis, displacement about which gives rise to a variation of blade pitch angle; the hub and pivotal connections, not being part of the invention, which is concerned with the blade itself, are not illustrated in the drawing and may be of any suitable type. The axis of rotation is indicated at O and the longitudinal axis of the blade is indicated by the chain dotted line OT. The blade rotates in the direction of the arrow A and its leading edge is indicated at L.

P and M are additional non-structural masses mounted on the blade by means of arms at $P^1$ and $M^1$ and are situated in advance of the leading edge so as to bring the mass centre of the whole blade forward of the position it would occupy if the blade were not artificially loaded.

As will be seen by inspection of the drawing, the mass P is situated at the root of the blade and the mass M at a radius indicated by K. The radius K corresponds approximately with or is somewhat greater than the radius of gyration of the blade about O and in the example the radius K is approximately 75% of the tip radius indicated by R. As above stated, the radius K may vary in different examples between about 75% and about 80% of the tip radius.

It may further be noted that the masses M and P are situated approximately in the plane of the chord, that is in the plane of the drawing, as has been stated above to be desirable. The mass P will in general be greater than the mass M and moreover is situated further from the blade axis OT so that it has more pronounced effect in augmenting the torsional moment of inertia of the blade.

As above stated, the torsional moment of inertia may conveniently be adjusted by suitably selecting the length of the arm $P^1$ and for this purpose the mass P may be adjustably mounted on the arm $P^1$.

What we claim is:

1. A rotor blade for aircraft sustaining rotors of the kind referred to having an additional nonstructural mass mounted thereon or incorporated therewith, said mass being situated approximately at the centre of inertia of the blade about its root or slightly nearer the tip of the blade.

2. A rotor blade, for aircraft sustaining rotors of the kind referred to, having substantially uniform mass distribution along its length and having an additional nonstructural mass, said mass being situated at approximately 75% to 80% of the tip radius of the blade.

3. A rotor blade for aircraft sustaining rotors of the kind referred to having an additional nonstructural mass mounted thereon or incorporated therewith, said mass being situated approximately at the center of inertia of the blade about its root or slightly nearer the tip of the blade and being disposed approximately on the line of the blade chord.

4. For an aircraft sustaining rotor having blades pivoted at least for flapping, a rotor blade having, in addition to the blade structure per se, an additional nonstructural mass, said mass being situated approximately at the center of inertia of the blade about its root or slightly nearer the tip of the blade, and located in advance of the mass center of the blade structure so as to advance the mass center of the whole blade.

5. For an aircraft sustaining rotor having blades pivoted for flapping and pitch variation, a rotor blade having, in addition to the blade structure per se, an additional nonstructural mass, said mass being situated approximately at the center of inertia of the blade about its root or slightly nearer the tip of the blade, and located in advance of the mass center of the blade structure so as to advance the mass center of the whole blade to such a degree as to ensure a negative pitching couple upon the blade during flight.

6. For an aircraft sustaining rotor having blades pivoted for flapping and pitch variation, a rotor blade having, in addition to the blade structure per se, an additional nonstructural mass, said mass being situated approximately at the center of inertia of the blade about its root or slightly nearer the tip of the blade, and located in advance of the mass center of the blade structure so as to advance the mass center of the whole blade to such a degree as to ensure a negative pitching couple upon the blade during flight, and a supplemental nonstructural weight disposed adjacent the root of the blade in a position offset from the longitudinal axis thereof for increasing the torsional inertia of the blade.

7. For an aircraft sustaining rotor having blades pivoted for flapping and pitch variation, a rotor blade having, in addition to the blade structure per se, an additional nonstructural mass, said mass being situated approximately at the center of inertia of the blade about its root or slightly nearer the tip of the blade, and located in advance of the longitudinal axis of the blade and of the mass center of the blade structure so as to advance the mass center of the whole blade to such a degree as to ensure a negative pitching couple upon the blade during flight, and a supplemental nonstructural weight disposed adjacent the root of the blade in a position offset from the longitudinal axis thereof for increasing the torsional inertia of the blade, the product of the mass of said second weight and its distance from the blade axis being greater than the product of said first mass and its distance from the blade axis.

JOHN JOSSELYN,
REGINALD BLAKE,
*Administrators of the Estate of Juan de la Cierva, Deceased.*

CERTIFICATE OF CORRECTION.

Patent No. 2,161,699. June 6, 1939.

JOHN JOSSELYN, ET AL, ADMINISTRATORS
of JUAN de la CIERVA, deceased.

It is hereby certified that error appears in the printed specification of the above numbered patent requiring correction as follows: Page 1, second column, line 1, for the word "top" read tip; line 22-23, for "outward" read outboard; and that the said Letters Patent should be read with this correction therein that the same may conform to the record of the case in the Patent Office.

Signed and sealed this 4th day of July, A. D. 1939.

Henry Van Arsdale

(Seal) Acting Commissioner of Patents.